United States Patent
Hui

(10) Patent No.: US 6,595,595 B1
(45) Date of Patent: Jul. 22, 2003

(54) WHEEL RIM HAVING DUAL CENTRIPETAL FLANGES

(76) Inventor: David Hui, 10F-1, No. 223, Nanking East Road, Sec. 5, Taipei (TW)

(*) Notice: Subject to any disclaimer, the term of this patent is extended or adjusted under 35 U.S.C. 154(b) by 0 days.

(21) Appl. No.: 10/223,784

(22) Filed: Aug. 16, 2002

(30) Foreign Application Priority Data

Jan. 31, 2002 (TW) .................................... 91201035 U

(51) Int. Cl.⁷ .............................................. B60B 21/00
(52) U.S. Cl. .................. 301/9.2; 301/11.1; 301/95.101
(58) Field of Search ................. 301/9.2, 10.1, 301/11.1, 63.101, 64.301, 64.305, 95.101, 95.109

(56) References Cited

U.S. PATENT DOCUMENTS 2,291,156 A * 7/1942 Heesch et al.
2,755,138 A * 7/1956 Brink
3,186,767 A * 6/1965 Walther
3,348,884 A * 10/1967 Adams
4,883,324 A * 11/1989 Fuchs et al. .................. 301/9.2

* cited by examiner

Primary Examiner—Russell D. Stormer

(57) ABSTRACT

A wheel rim includes two centripetal flanges respectively centripetally formed on an inner and an outer portion of a drop-center portion of the wheel rim having different displacements of the two centripetal flanges respectively deviated from a longitudinal center plane centrally defined between an inner rim flange and an outer rim flange of the wheel rim, with the longitudinal center plane being projectively perpendicular to a central axle axis of the wheel rim, thereby simultaneously satisfying two types of cars, one having a larger off-set and the other having a smaller off-set of each wheel disk as respectively deviated from the longitudinal center plane of each wheel rim.

1 Claim, 4 Drawing Sheets

WHEEL RIM HAVING DUAL CENTRIPETAL FLANGES

BACKGROUND OF THE INVENTION

A conventional wheel rim R as shown in FIG. 1 has a flange F formed on an inside cylindrical surface of a drop-center portion of the rim R adapter for securing a wheel disk D on the flange F as solid lines shown in FIG. 1. However such a flange F on the conventional wheel rim R may only provide a single off-set $O_1$, a displacement of the bottom of the disk D from a longitudinal center plane C centrally defined between two rim flanges Ra, Rb of the wheel rim R. If a car needs a shorter off-set $O_2$ (a shorter displacement from the longitudinal center plane C), another wheel rim having a flange F' proximal to the center plane C should be provided for securing the wheel disk D' on the flange F' as dotted lines shown in FIG. 1.

Therefore, two wheel rims for respectively providing a longer off-set $O_1$ and a shorter off-set $O_2$ should be prepared to thereby increase the investment and manufacturing cost.

The present inventor has found the drawbacks of the conventional wheel rim and invented the present wheel rim having dual flanges formed on the rim.

SUMMARY OF THE INVENTION

The object of the present invention is to provide a wheel rim including two centripetal flanges respectively centripetally formed on an inner and an outer portion of a drop-center portion of the wheel rim having the two centripetal flanges with different displacements respectively deviated from a longitudinal center plane centrally defined between an inner rim flange and an outer rim flange of the wheel rim, with the longitudinal center plane being projectively perpendicular to a central axle axis of the wheel rim, thereby simultaneously satisfying two types of cars one having a larger off-set and the other having a smaller off-set of each wheel disk as respectively deviated from the longitudinal center plane of each wheel rim.

DETAILED DESCRIPTION

Figure 1:
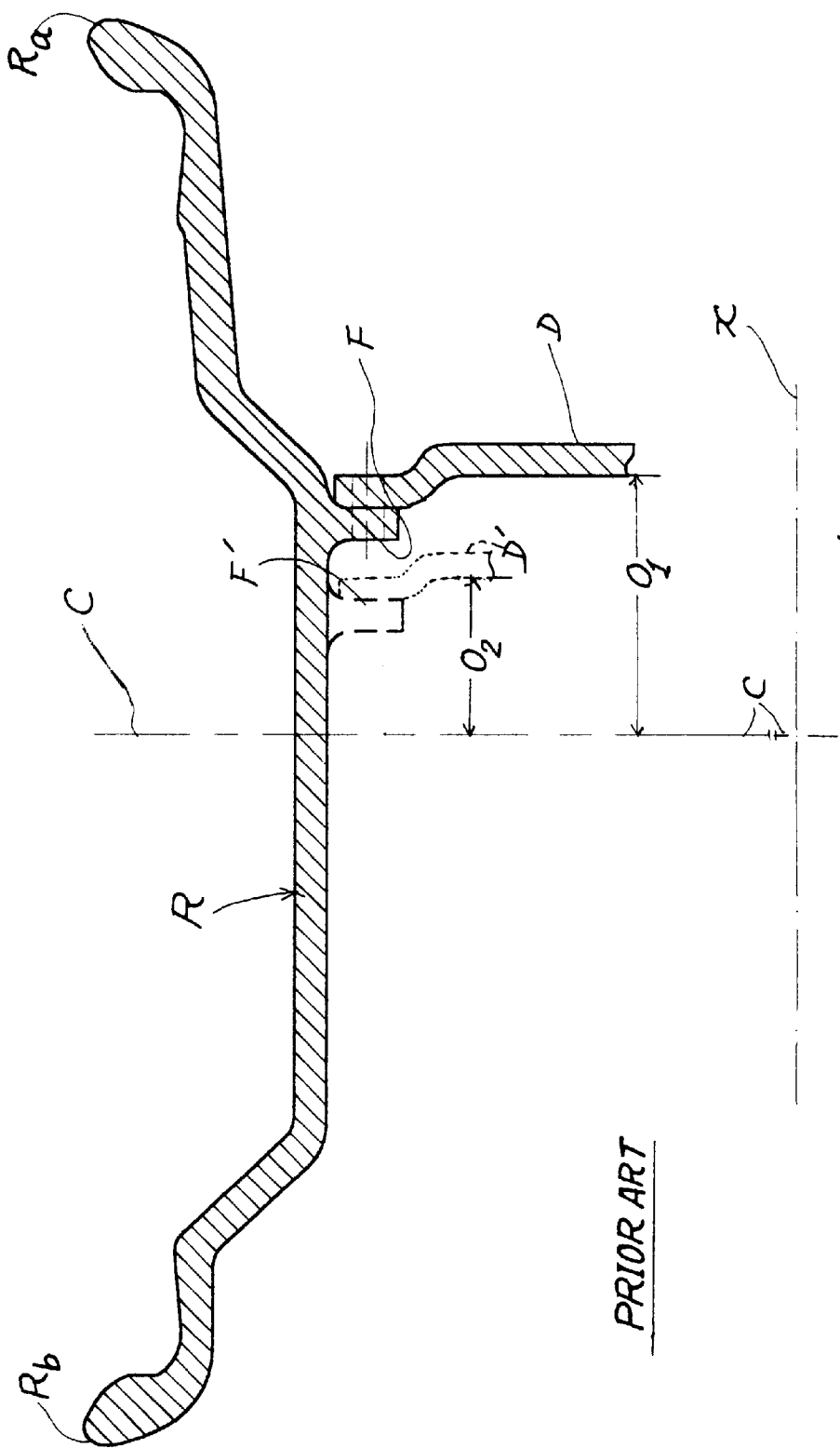
FIG. 1 is a partial sectional drawing of a conventional wheel rim.
Figure 2:
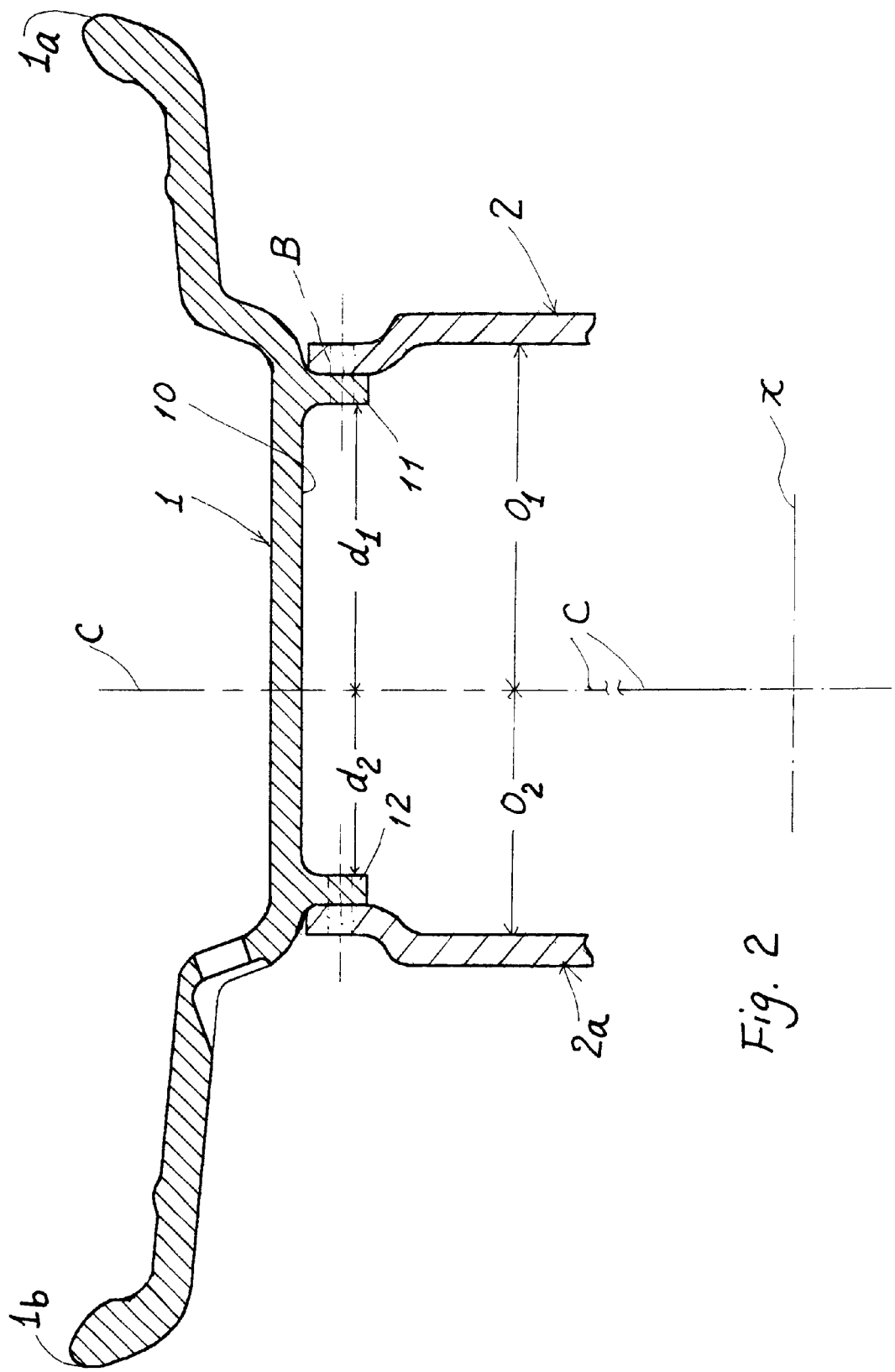
FIG. 2 is a partial sectional drawing of the wheel rim of the present invention.
Figure 3:
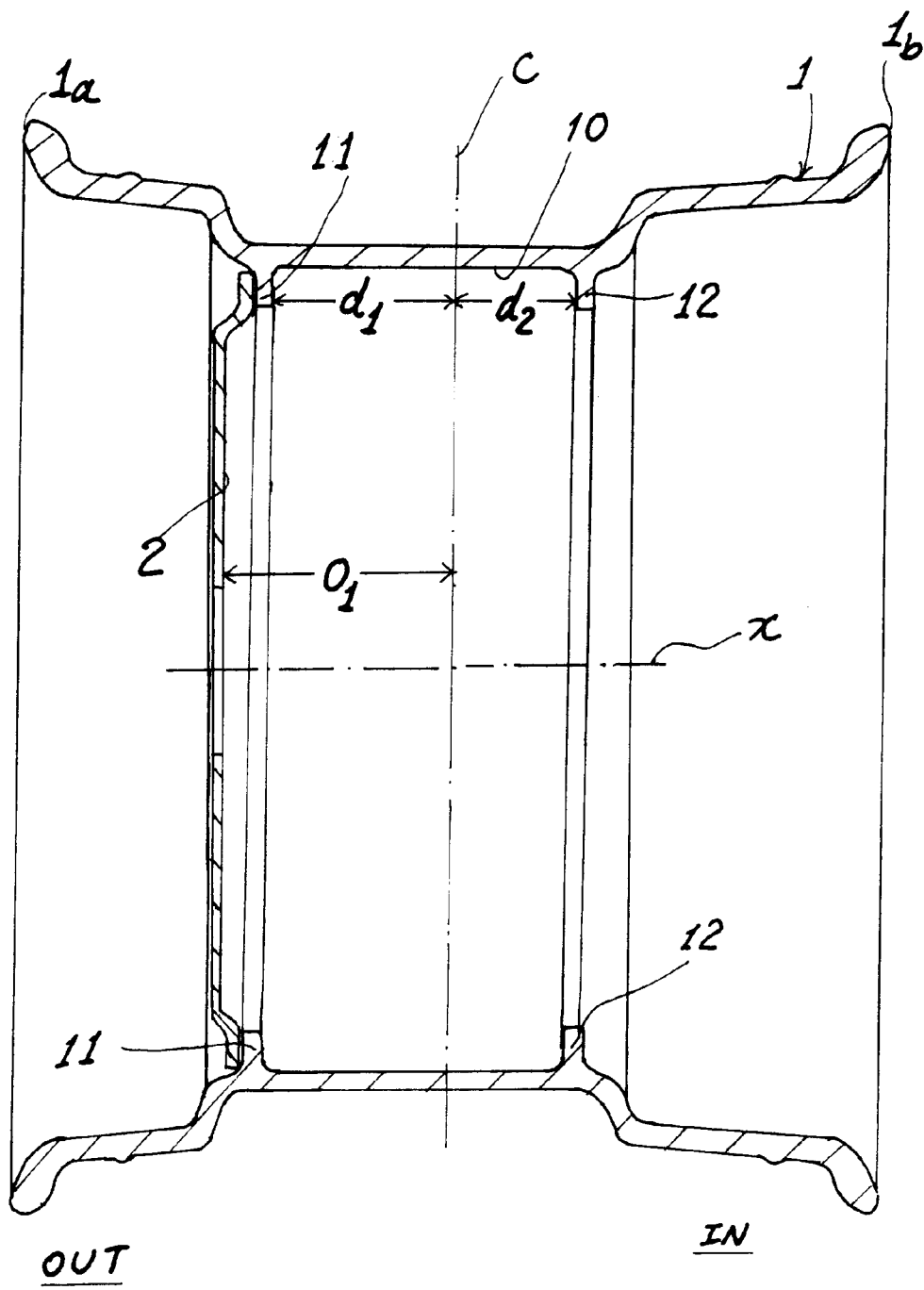
FIG. 3 is a sectional drawing of the wheel rim of the present invention with larger off-set.
Figure 4:
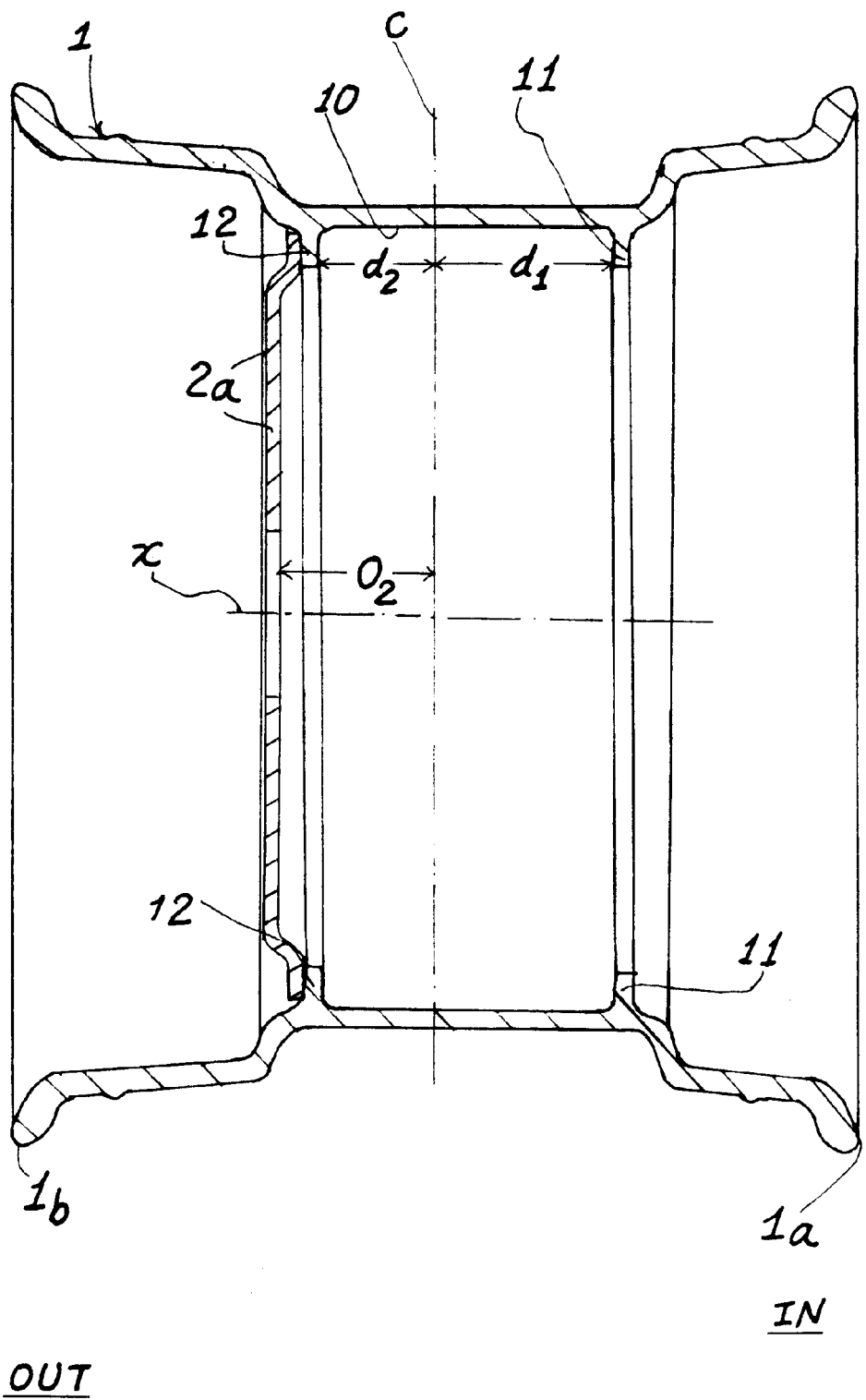
FIG. 4 is a sectional drawing of the wheel rim of the present invention with smaller off-set.

As shown in FIGS. 2~4, the wheel rim 1 of the present invention comprises: a longitudinal center plane C centrally defined between two rim flanges 1a, 1b engaged with the tire beads; a central axle axis X defined at a geometrical center of the wheel rim 1 (also of a car axle) and being projectively perpendicular to the longitudinal center plane C; a first centripetal flange 11 formed on a first portion of an inside cylindrical surface of a drop-center portion 10 of the wheel rim 1 and centripetally protruding towards the central axle axis X and deviated from the longitudinal center plane C with a first distance $d_1$ adapted for fixing a first wheel disk 2 separated from the longitudinal center plane C with a first off-set $O_1$; and a second centripetal flange 12 formed on a second portion of the inside cylindrical surface of the drop-center portion 10 of the wheel rim 1 opposite to the first centripetal flange 11 and centripetally protruding towards the central axle axis X and deviated from the longitudinal center plane C with a second distance $d_2$ adapted for fixing a second wheel disk 2a separated from the center plane C with a second off-set $O_2$.

The first and second centripetal flanges 11, 12 are unsymmetrically disposed on opposite sides of the longitudinal center plane C.

The disk 2 or 2a may be selectively secured on the flange 11 or 12 to obtain a first or second off-set $O_1$ or $O_2$. The wheel rim 1 may be turned in 180 degrees about the center plane C such as from FIG. 2 to FIG. 3.

For example, the disk 2 is secured to the first flange 11 as shown in FIG. 3 to obtain a first off-set $O_1$ of the disk 2. The numeral "IN" indicates the axle side (inside) of a car; while the numeral "OUT" indicating outside of the car distal from the axle.

In FIG. 4, another disk 2a may be secured to the second flange 12 to obtain a second off-set $O_2$, just by turning the rim 1 in 180 degrees about the center plane C from FIG. 3 to FIG. 4 to orient the second centripetal flange 12 outwardly (OUT).

The disk 2 or 2a may be joined with the flange 11 or 12 by welding, by bolts and nuts through the holes B, or by any other joining methods.

The present invention provides a wheel rim simultaneously having two centripetal flanges 11, 12 having different distances $d_1$, $d_2$ respectively separated from the longitudinal center plane C so that two off-set values may be optionally selected to satisfactorily match with a sedan requiring a larger off-set $O_1$ or a station wagon requiring a smaller off-set $O_2$.

Accordingly, only one wheel rim may satisfy two types of cars requiring different off-set values of their wheel disks; thereby decreasing the production (mold) cost, increasing the manufacturing flexibility, and benefiting the inventory control and material management.

The present invention may be modified without departing from the spirit and scope of the present invention.

I claim:

1. A wheel rim comprising:

a longitudinal center plane centrally defined between two rim flanges engaged with a wheel tire;

a central axle axis defined at a geometrical center of the wheel rim and being projectively perpendicular to the longitudinal center plane;

a first centripetal flange formed on a first portion of an inside cylindrical surface of a drop-center portion of the wheel rim and centripetally protruding towards the central axle axis and deviated from the longitudinal center plane with a first distance adapted for fixing a first wheel disk separated from the longitudinal center plane with a first off-set; and a second centripetal flange formed on a second portion of the inside cylindrical surface of the drop-center portion of the wheel rim opposite to the first centripetal flange and centripetally protruding towards the central axle axis and deviated from the longitudinal center plane with a second distance adapted for fixing a second wheel disk separated from the longitudinal center plane with a second off-set; with said first and second centripetal flanges unsymmetrically disposed on opposite sides of said longitudinal center plane; whereby upon alternative turning of said wheel rim in 180 degrees about the longitudinal center plane, one said centripetal flange corresponding to an off-set value of a wheel disk will be oriented outwardly for securing said wheel disk on said centripetal flange.

* * * * *